United States Patent [19]

Canaperi et al.

[11] Patent Number: 5,576,099
[45] Date of Patent: *Nov. 19, 1996

[54] INDUCTIVE HEAD LAMINATION WITH LAYER OF MAGNETIC QUENCHING MATERIAL

[75] Inventors: Donald F. Canaperi, Bridgewater, Conn.; Mahadevaiyer Krishnan, Hopewell Junction, N.Y.; Sol Krongelb, Somers, N.Y.; David L. Rath, Stormville, N.Y.; Lubomyr T. Romakiw, Briarcliff Mano, N.Y.

[73] Assignee: International Business Machines Corporation, Armonk, N.Y.

[*] Notice: The portion of the term of this patent subsequent to Jul. 16, 2008, has been disclaimed.

[21] Appl. No.: 477,696

[22] Filed: Feb. 9, 1990

[51] Int. Cl.$^6$ ................................ G11B 5/66; B32B 5/16
[52] U.S. Cl. .................... 428/332; 428/336; 428/611; 428/667; 428/678; 428/694 T; 428/694 TS; 428/694 TM; 428/900; 360/125; 360/126
[58] Field of Search ........................ 428/611, 667, 428/678, 694, 900, 928, 332, 336, 694 T, 694 TS, 694 TM; 360/125, 126

[56] References Cited

U.S. PATENT DOCUMENTS

| | | | |
|---|---|---|---|
| 3,119,753 | 1/1964 | Mathias et al. | 205/89 |
| 3,303,111 | 2/1967 | Peach | 205/258 |
| 3,634,209 | 1/1972 | Wolf et al. | 205/176 |
| 3,715,793 | 2/1973 | Kefalas et al. | 428/601 |
| 4,108,739 | 8/1978 | Tadokoro et al. | 205/176 |
| 4,472,248 | 9/1984 | Koskenmaki | 205/258 |
| 4,610,935 | 9/1986 | Kumasaka et al. | 428/632 |
| 4,687,712 | 8/1987 | Sugita et al. | 428/611 |
| 4,748,089 | 5/1988 | Kumasaka et al. | 428/635 |
| 4,901,179 | 2/1990 | Satomi et al. | 360/126 |
| 4,920,013 | 4/1990 | Kobayashi et al. | 428/694 TM |
| 5,032,945 | 7/1991 | Argyle et al. | 360/126 |
| 5,108,837 | 4/1992 | Mallary | 428/336 |
| 5,379,172 | 1/1995 | Liao | 360/126 |

FOREIGN PATENT DOCUMENTS

| | | |
|---|---|---|
| 0427171 | 5/1990 | European Pat. Off. |
| 2833249 | 2/1980 | Germany. |
| 57-071518 | 5/1982 | Japan. |

OTHER PUBLICATIONS

Physical Review, B. Condensed Matter, vol. 39, No. 7: 4828–4830 (Mar. 1989) G. Binash, et al. "Enhanced magnetoresistance in layered magnetic structure with antiferromagnetic interlayer exchange."

IEEE–Transactions On Magnetics, vol. 5, No. 3: 515 (Sep. 1969) I. W. Woolf, et al. "The Influence of Ni(P) Underlayers on Magnetic Properties of Electrodeposited Permalloy Films."

IEEE–Transactions on Magnetics, Mag-7, No. 1: 146–150 (Mar. 1971) J. P. Lazzari and I. Melnick "Integrated Magnetic Recording Heads."

IEEE–Transactions on Magnetics, Mag-13, No. 5: 1521–1523 (Sep. 1977) J. S. Y. Feng and D. A. Thompson "Permeability of Narrow Permalloy Stripes".

IBM Technical Disclosure Bulletin, vol. 20, No. 11B: 5035–5036 (Apr. 1978) J. V. Powers "Individualization of Bubble Device Overlay Properties".

Journal of Applied Physics, vol. 38, No. 3: 1258–1259 (Mar. 1967) P. A. Albert et al. "Effect of Phosphorus on the Magnetization of Nickel".

IEEE–Transactions on Magnetics, vol. 24, No. 3: 2045–2054 (May 1988) John C. Slonczewski et al. "Micromagnetics of Laminated Permalloy Films".

Surface Technology, 25: 7–15 (1985) C. C. Nee and R. Weil "The Banded Structure of Ni–P Electrodeposits."

Primary Examiner—Leszek Kiliman
Attorney, Agent, or Firm—Scully, Scott, Murphy & Presser

[57] ABSTRACT

Laminates of magnetic and magnetic quenching laminae are provided for use as magnetic thin film laminates for use in magnetic recording heads. The use of these films significantly reduces the number of domains and Barkhausen noise levels in such recording heads.

10 Claims, 5 Drawing Sheets

INDUCTIVE HEAD LAMINATION WITH LAYER OF MAGNETIC QUENCHING MATERIAL

BACKGROUND OF THE INVENTION

1. Field of the Invention

This invention relates to magnetic thin films for use in electronic recording heads and to a method for preparing such films. More particularly, this invention relates to such thin films as are comprised of electromagnetic films of preferably, NiFe and designed to reduce the number of domains and Barkhausen noise levels in the recording heads in which such films are used.

2. Description of the Prior Art

The trends toward higher density magnetic storage devices in electronic data processing equipment require the use of smaller dimensions for the inductive read/write or magnetic recording heads used in such equipment. However, as the width of the pole tip in such heads becomes very narrow, that is, narrower than about 2 times the domain wall width, and the thickness of the magnetic film is not increased, the shape of the recording head begins to dominate the structure of the magnetic domain (J.P. Lazzari and I. Melnick, IEEE-Transactions On Magnetics, MAG-7, 146, 1971). The resulting structure can then impair the performance of the recording head by introducing Barkhausen noise and by decreasing the signal to noise ratio.

Lamination of the magnetic heads has been proposed as a means to control domain structure on recording heads of these dimensions (J. S. Y. Feng and D. A. Thompson, IEEE Transactions On Magnetics, MAG-13, 1521, 1977).

It has been postulated by the present inventors that in such structures the laminating layers should also be non-magnetic, continuous and pore free with thicknesses between 10 and 400 angstroms (Å), in order to provide optimum benefits in terms of reducing the level of Barkhausen noise and increasing the signal to noise ratio.

Furthermore, to be practically useful the non-magnetic laminating layers should obviously retain their properties during the thermal cycling which is employed during the manufacturing and/or use of the composite laminates.

The use of a quenching type non-magnetic lamination material would further insure the integrity of the composite film and tend to relax. The pore-free requirements of the non-magnetic layer. The non-magnetic property of the lamination material should, advantageously, result from quenching rather than from simple dilution.

J. V. Powers (IBM Technical Disclosure Bulletin, vol. 20, No. 11B, April 1978, "Individualization of Bubble Device Overlay Properties") reported that:

"In the fabrication of bubble devices, the coercivity of permalloy used to move bubble domains is often a function of underlays onto which the permalloy is deposited. NiP is one such underlay. It has been found that the coercivity of permalloy on a NiP underlay will depend on the thickness of the underlay, for thicknesses up to about 800 angstroms, if the following bath is used for plating of the underlayer.

The NiP plating bath is as follows:

| | |
|---|---|
| NiCl.6 H$_2$O | 109 gms |
| H$_3$BO$_3$ | 25 gms |
| Sodium Saccharin | 8.0 gms |

-continued

| | |
|---|---|
| Sodium Lauryl Sulfate | 0.2 gms |
| Na$_2$HPO$_2$ | 20 gms |
| H$_2$O | in sufficient amount to make 1 liter |

The variation of permalloy coercivity H$_c$ versus thickness of the NiP underlayer is shown in the figure. A great degree of control is provided over a wide range of NiP. An example of utility of this technique is in the fabrication of bubble domain transfer switches, where it is sometimes desirable to provide a holding field. In such switches, a lesser thickness of NiP underlayer is provided in order to make the permalloy of higher coercivity in the switch area. This permalloy is then used to provide the holding field."

The figure referred to by J. V. Powers is reproduced as FIG. 1 of the drawings of this application.

The NiFe/NiP laminates produced by J. V. Powers were produced from an electroless bath, and as such would have the following shortcomings for use in magnetic recording heads: they would be porous, rough and non-continuous and not of uniform thickness. The J. V. Powers structures were also two layer laminates, with one layer of NiP and one layer of NiFe, which would provide a plurality of domain walls within his structure. The J. V. Powers structures would thus not be useful in thin film magnetic head structures.

Prior to the present invention, therefore, it has not been readily possible to provide dimensionally stable magnetic thin film laminates which also provide optimum benefits in terms of both limiting the number of domains, reducing Barkhausen noise, and increasing the signal to noise ratio, when used in magnetic recording heads using relatively narrow pole tips.

An object of the present invention is to provide novel magnetic thin film laminates for use in magnetic recording heads.

A further object of the present invention is to provide such laminates as are made from laminae of magnetic alloys such as NiFe, CoFe, CoNi, and non-magnetic alloys and metal materials such as NiP, Cr and CrNi that have magnetic quenching properties.

A still further object of the present invention is to provide magnetic recording heads made with such thin film laminates.

A further object of the present invention is to provide magnetic recording heads having as few domains as possible, and preferably no more than one.

A further object of the present invention is to provide magnetic recording heads having a very low Barkhausen noise.

A further object of the present invention is to provide magnetic recording heads having an increased signal to noise ratio.

A further object of the present invention is to provide magnetic thin films which are specifically useful in magnetic recording heads which have pole tips which are narrower in size than about 2 times the domain wall width.

SUMMARY OF THE PRESENT INVENTION

The objects of the present invention are achieved by forming thin film magnetic films from magnetic laminae of magnetic alloys such as NiFe, CoFe and CoNi and magnetic quenching laminae, particularly certain P or Cr containing magnetic quenching laminae of NiP, Cr or CrNi, using electroplating baths and processes, and then fabricating magnetic recording heads with such thin film magnetic films.

DETAILED DESCRIPTION OF THE PREFERRED EMBODIMENT OF THE INVENTION

Thin Film Laminates

Figure 1:
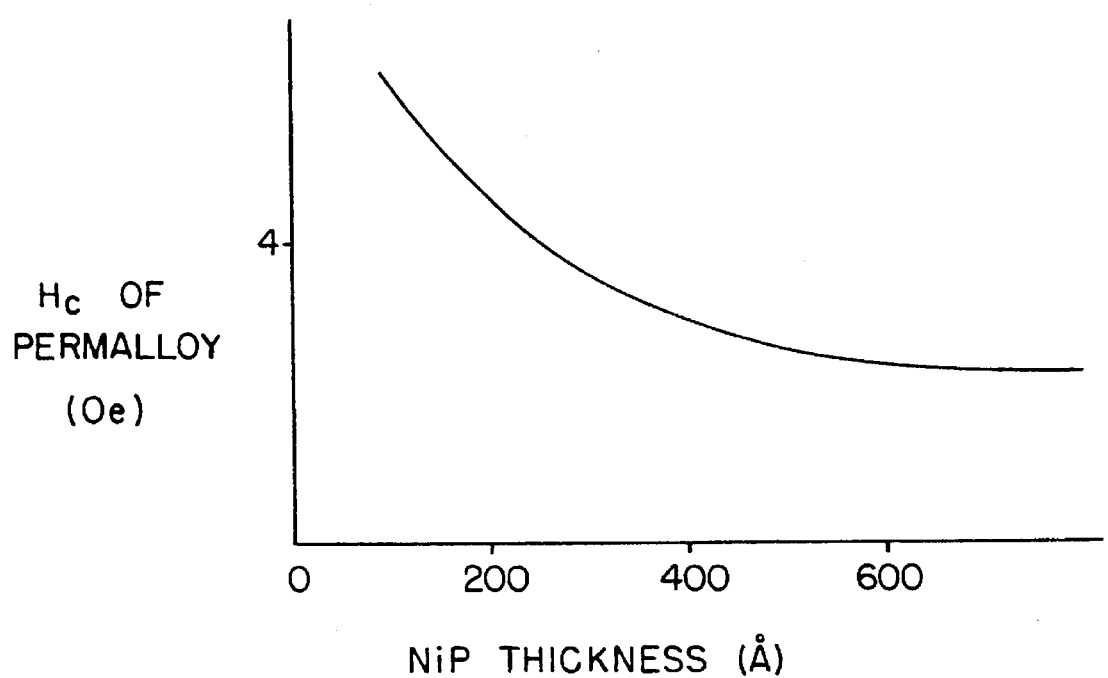
FIG. 1 is a reproduction of a graph showing the relationship between the thickness of NiP underlays, in angstrom units, relative to the resulting coercivity value (Hc), in units (Oe) of certain prior art permalloy/NiP laminates when used in bubble devices.

The thin film magnetic films of the present invention are formed as laminates of at least one thin magnetic quenching lamina, preferably a P or Cr containing magnetic quenching film of NiP, Cr or CrNi, sandwiched between two magnetic laminae. The magnetic laminae may be formed of any magnetic alloy and is preferably NiFe. CoFe and CoNi may also be used. The NiFe laminae is commonly referred to as permalloy which comprises about 70 to 90 weight % Ni and about 10 to 30 weight % Fe.

The permalloy films may be prepared by known techniques such as electrodeposition, sputtering, or vapor deposition, on a non-magnetic substrate.

When using NiFe as the magnetic laminae, the Permalloy films are about 100 to 50,000, and preferably about 500 to 5,000 Å thick.

In forming the thin film laminates of the present invention, the magnetic quenching thin film laminae are electrodeposited on a first magnetic lamina and then a second lamina of the magnetic material is superimposed on the free or non-laminated side of the deposited magnetic quenching layer preferably by electrodeposition. The magnetic quenching layers are electrodeposited in thicknesses of about 10 to 500, and preferably of about 60 to 200 Å. The electrodeposited magnetic quenching layers, when electrodeposited on the magnetic layers form an integral continuous bond with the magnetic layers.

In forming thin film laminates for recording heads, it is known that the inclusion of a thin film non-magnetic spacer enhances the device performance. It is desirable to form the non-magnetic spacer as pore free as possible. However, when forming very thin spacers, on the order of 100 Angstroms, pores will be present in the films. Upon deposition of a magnetic layer on such thin films, the magnetic material will fill the holes in the spacer and thereby reduce the enhancing effects of the spacer. In accordance with the present invention, by providing a non-magnetic spacer of a material that is a magnetic quenching material, the adverse effects of the magnetic material that fills the pores in the spacer will be eliminated.

The magnetic quenching layers are therefore essentially non-porous, as evidenced by the presence of a pore area of less than about 0.1% of the plated interface surface with the magnetic layer, and by their being continuous, as evidenced by the resulting domain structures in recording heads made therewith and their ability to retain their properties during subsequent thermal treatment as evidenced by Auger studies. The magnetic quenching properties of the phosphorous or chromium in the inventive spacer significantly reduces the magnetic properties of the magnetic material that fills the pores thereby improving the effects of the spacer and hence the performance of devices formed therewith.

The laminates may contain up to about 40 laminae of each of the magnetic and magnetic quenching laminae, with the understanding that both the terminal or end laminae must be magnetic.

The composite magnetic films thus have thicknesses of the order of about 1,000 to 50,000, and preferably of about 5,000 to 20,000 Å. The magnetic thin film laminates are preferably used in magnetic recording heads. The recording heads of the present invention have, preferably, no more than a single domain wall, a reduced Barkhausen noise and an increased signal to noise ratio.

After the magnetic recording head has been constructed with the thin magnetic film laminates of the present invention, it is preferably annealed under an inert gas, or a reducing, atmosphere by being heated at about 250 to 300°C. for about 5 to 40 hours.

NiP laminae

The NiP alloy laminae of the present invention are prepared from an aqueous plating solution using a pulsed current electrodeposition process. The NiP laminae are deposited from such baths onto cathodes of the magnetic laminae.

A preferred NiP plating bath consists of 30 g/l nickel sulfate, 10 g/l hypophosphite, 10 g/l sodium acetate and 0.1 g/l Sodium lauryl sulfate with the pH adjusted to 4.0. sulfuric acid may be used to provide the desired pH value (C. C. Nees and R. Weil, Surf. Tech., Vol. 25, page 7, 1985). The plating temperature of the bath is maintained at 35°C. The current profile consists of two pulse trains. The first is a 200 Hz square pulse train with 50% duty cycle and 10 mA/cm$^2$ peak current applied for about 2 seconds. Immediately following this is the plating profile consisting of pulses held at 2.5 mA/cm$^2$ for 0.8 seconds with an "off" time of 1.0 seconds between pulses. This plating scheme allows the deposition of continuous films at thicknesses on the order of 100 angstroms.

Figure 2:
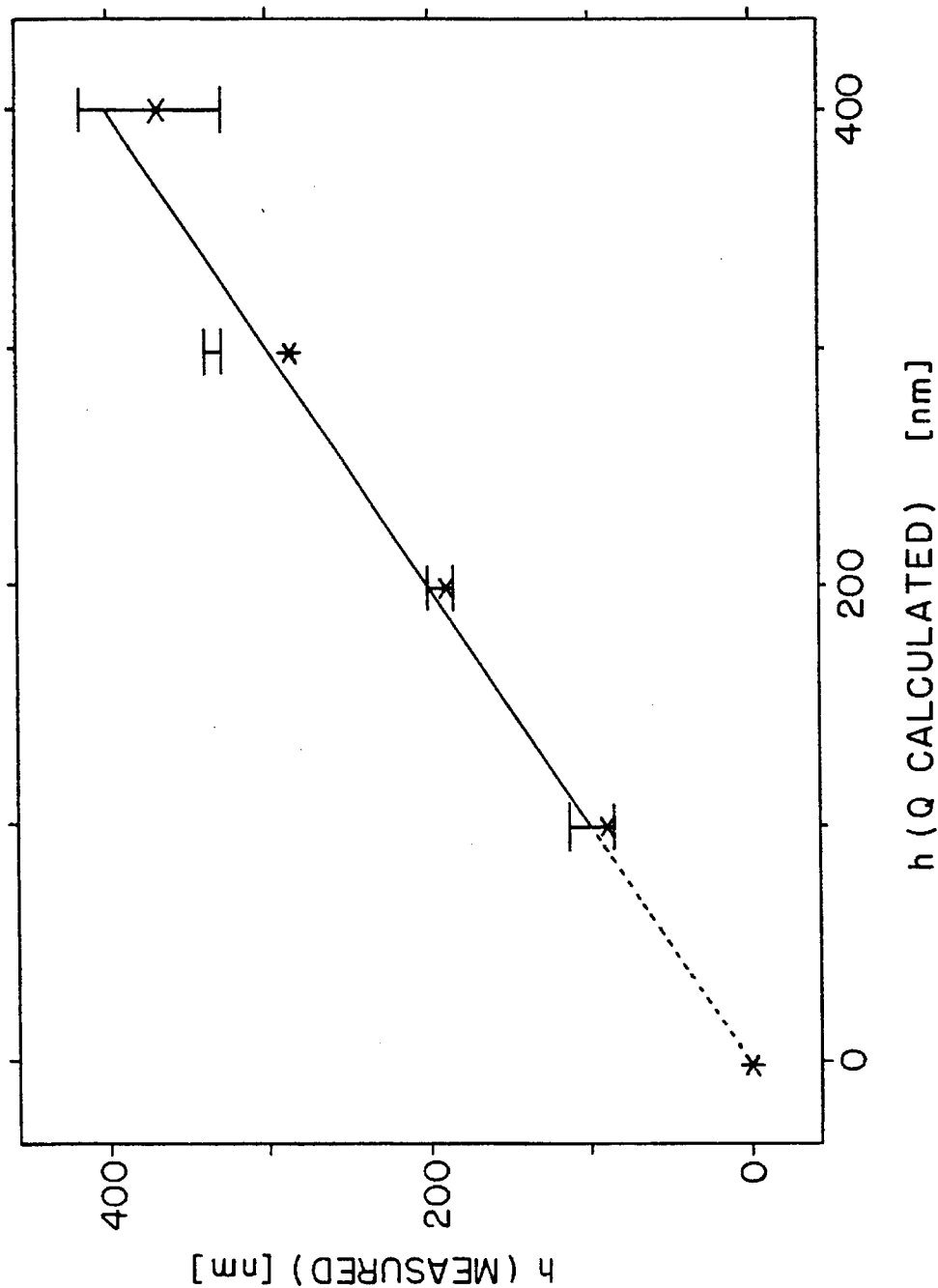
FIG. 2 is a graph of the efficiency of the plating of NiP on NiFe in accordance with the present invention.

FIG. 2 illustrates the actual plating rate as determined by weight gain and profilometry in comparison to that calculated from Faraday's law using such preferred NiP : and plating conditions. As shown in FIG. 2, the horizontal axis, h (Q calculated) is the expected thickness of NiP based on Faraday's law. The vertical axis, h(measured), is the measured thickness. The "*" indicates measurement of the gain in weight of the NiP layer during the electroplating process. The vertical bars represent the range of values obtained by profilometry at different points on a plated sample. The solid line represents the theoretical curve for 100% efficient plating. The substrates were permalloy monitor wafers that were either blanket films or patterned with photoresist. From the data the current efficiency is calculated to be 100% +/−5 for NiP films of thickness greater than 1000 angstroms. The overall plating rate for the NiP deposition is 100 angstroms per 27 seconds or, equivalently, 15 plating pulses.

Figure 3:
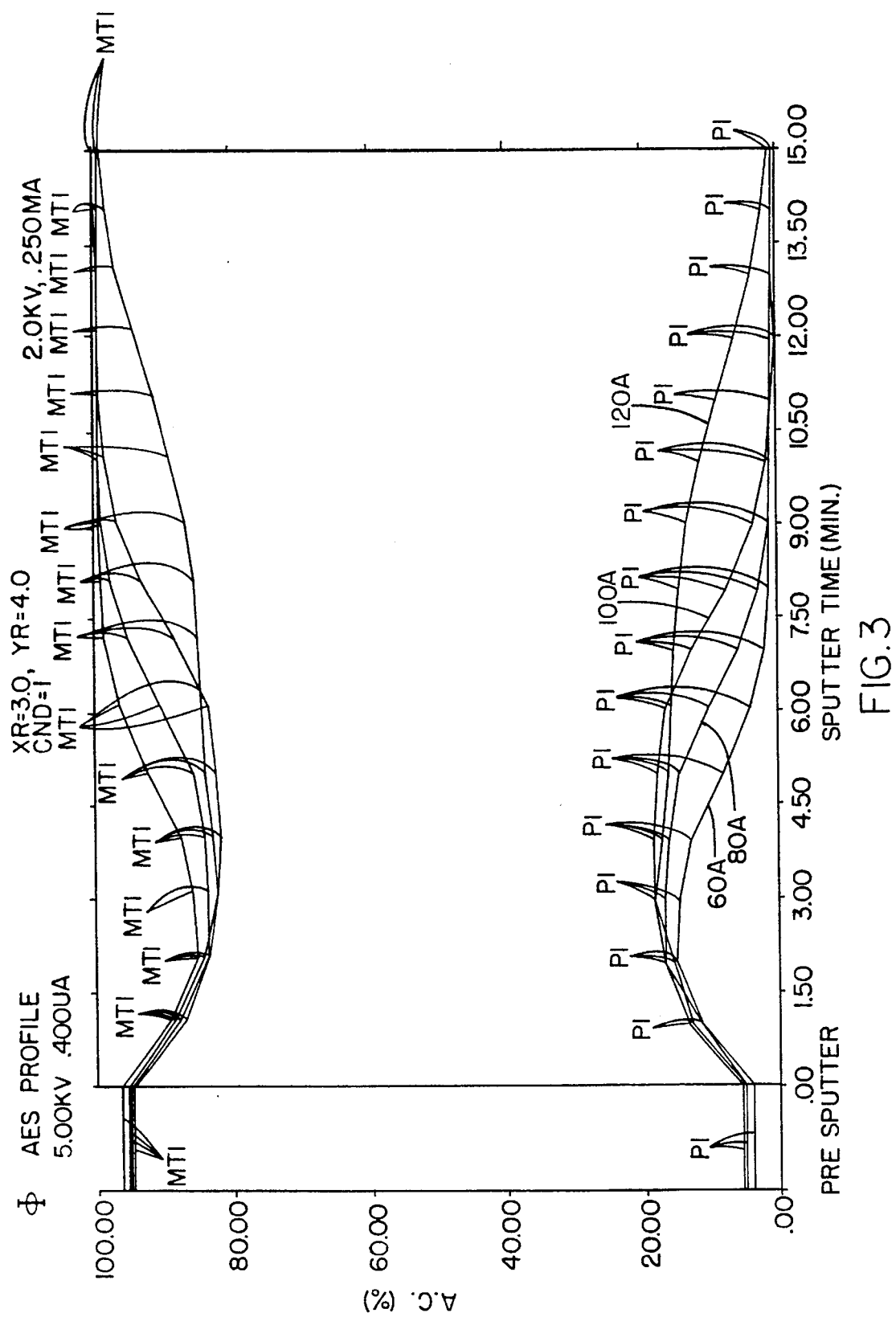
FIG. 3 is a graph of the Auger depth profiles of the electrodeposited Nip films as deposited on NiFe in accordance with the present invention.

Auger depth profiling was used to analyze for NiP deposits with thicknesses less than 1000 angstroms. Shown in FIG. 3 are the profiles of NiP films of calculated thicknesses as indicated. The atomic % of Ni (upper curve) and atomic % of P (lower curve) in the NiP alloy layer is plotted against an ion sputter time (in minutes) that was used to etch the NiP alloy layer away. The lower phosphorous curves are plotted as atomic concentrations in percent while the upper nickel curves are normalized with respect to the phosphorous to total 100%. The concentration of phosphorous is about 18% and is independent of the thickness of the deposit within the accuracy of Auger. The sputter etching time of the NiP layer is indicative of the actual thickness and follows closely the calculated amount of NiP deposited. The exposed surface is represented at zero sputtering time. The consistent value of about 5% for the surface concentration of phosphorous is an artifact of the Auger and is due to the different escape depths of the Auger electrons for Ni and P. X-ray photoelectron spectroscopic measurements carried out on similar films have shown that the surface phosphorous concentration is actually somewhat higher than it is deeper into the film. Auger energy spectra have shown that the NiP layer and its interface with the permalloy substrate cannot detect any other elements.

Figure 4:
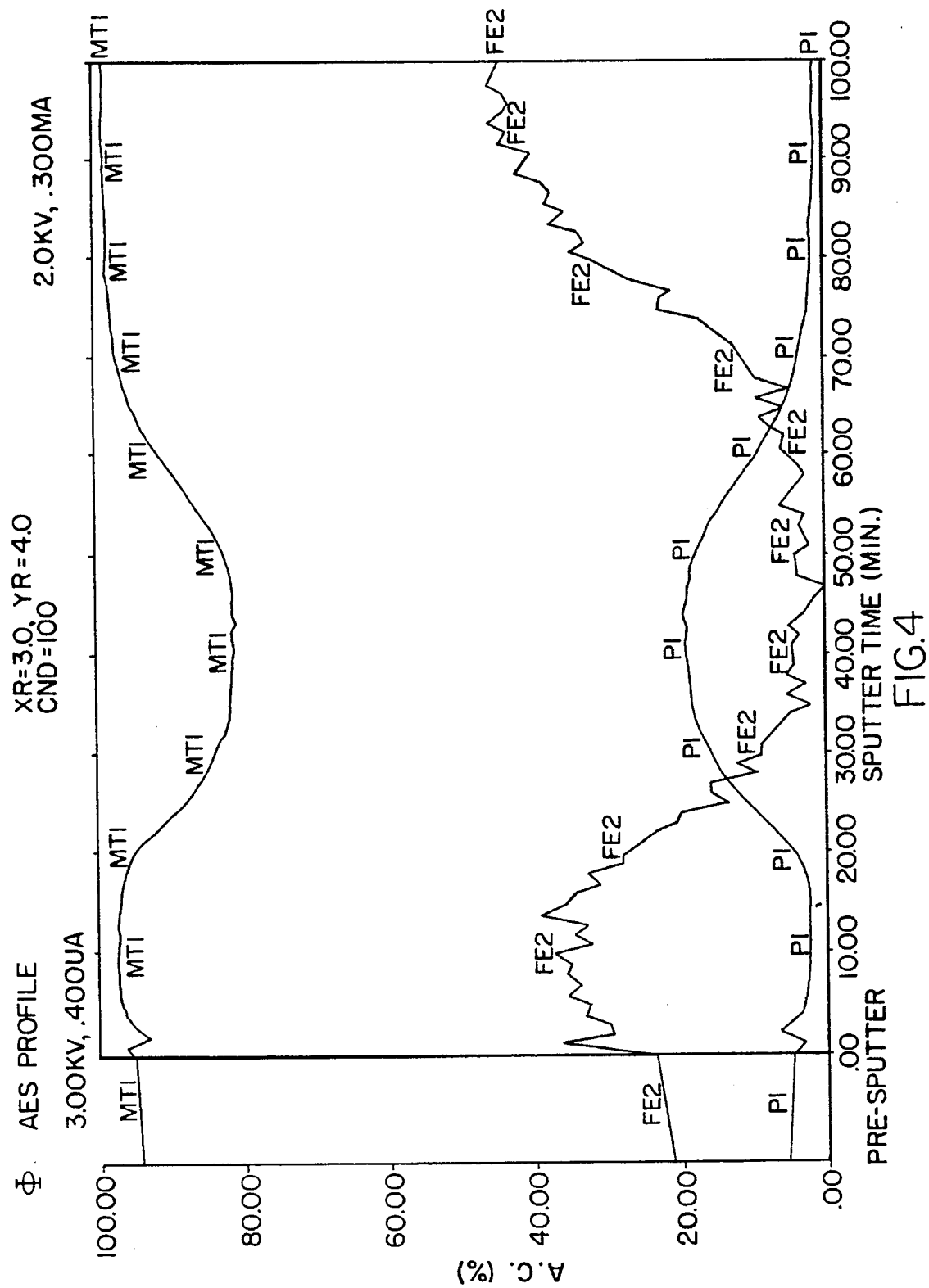
FIG. 4 is a graph of an Auger depth profile of a three layer laminate of permalloy/NiP/permalloy made according to the present invention.

FIG. 4 shows the Auger depth profile of a 200 angstrom NiP layer electrodeposited on permalloy with a 100 angstrom evaporated permalloy overcoat. The graph plots the concentration of Ni, P and Fe in the laminate, versus the sputter time, in minutes. The P concentration is shown in atomic percent. The Fe peak height is arbitrarily scaled. In FIG. 4, the curve designated "NI1" is the nickel content curve, the curve designated "P1" is the phosphorous content curve and the curve designated "FE2" is the iron content curve. The NiP layer was first deposited on the NiFe substrate using the preferred bath and plating conditions described above. This sample was annealed for 20 hours at 265°C. to test the effects of thermal cycling on diffusion. In FIG. 4, the phosphorous is scaled in atomic percent with the nickel again normalized to 100% as before. The iron curve is the Auger peak height arbitrarily scaled, where the maximum value corresponds to the permalloy concentration of 18%. The iron profile shows an effective lamination where the magnetic layers are separated by a region of approximately 18% atomic concentration of phosphorous. Furthermore, the small iron signal in the middle of the NiP layer is primarily due to the noise level of the Auger rather than the presence of iron or to pores in the NiP layer. The pore area here is estimated to be less than 0.1% of the plated surface. In comparison, depth profiles of similar samples that were not annealed are essentially identical. Thus the amount of phosphorous diffusion out of the NiP layer is insignificant. Annealing, however, may provide a means to close small magnetic pores through the NiP layer, reinforcing the laminating barrier. It should be noted here that a NiP alloy with greater than 8% atomic phosphorous is non-magnetic (P. A. Albert, Z. Kovac, J. R. Lilienthal, T. R. McGuire, and Y. Nakamura, Journal of Applied Physics, Vol. 38, 1258, 1967). It is expected that about 10% of phosphorous in permalloy would quench its magnetic properties.

Figure 5:
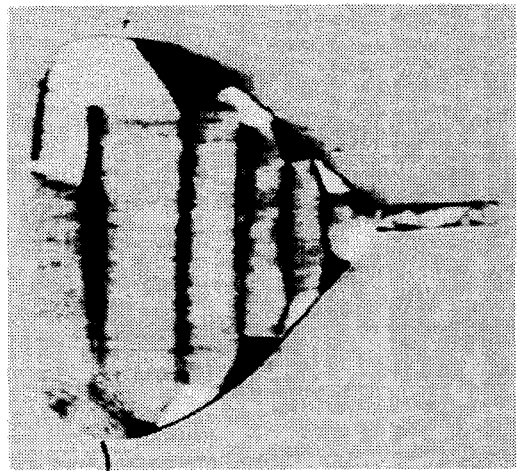
FIGS. 5 and 7 show the domain structures that result in recording heads made without the film laminates of the present invention.
Figure 6:
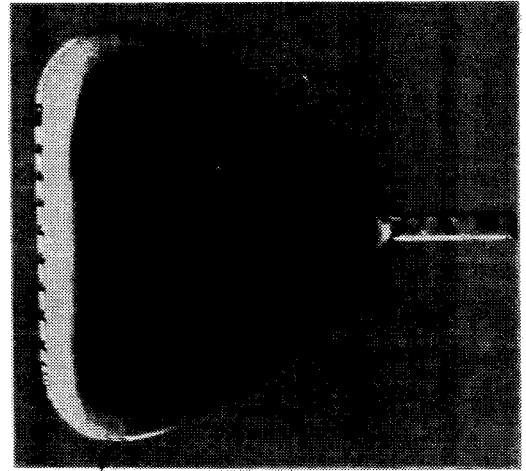
FIGS. 6 and 8 show the domain structures that result in recording heads made with two NiFe layers and an interposed NiP layer i in accordance with the present invention.
Figure 7:
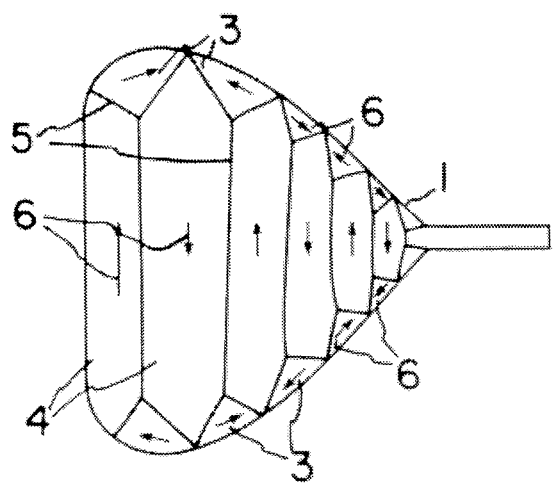
Figure 8:
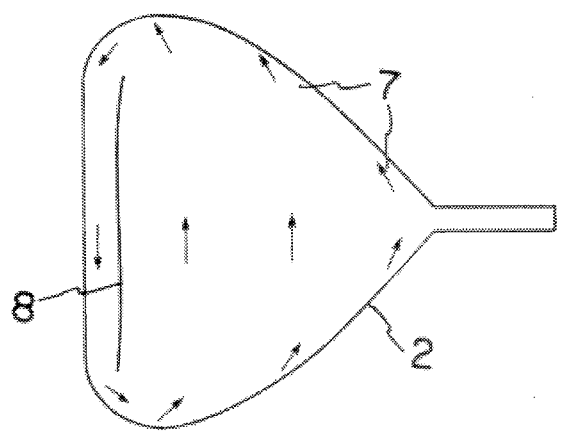

The effect of NiP lamination on the magnetic domain structure of permalloy is shown in FIGS. 5 to 8. FIGS. 5 and 6 are LAMOM Kerr magnetooptic magnetic domain images showing the wall movement under a varying applied magnetic field in inductive recording head yokes 1 and 2. FIGS. 7 and 8 are drawings showing the domains, walls and orientation of the corresponding images of FIGS. 5 and 6, respectively. The FIG. 5 image is the result of the use of a permalloy film without lamination in head yoke 1. The structure contains many domains, as seen in FIG. 7, whose walls are mobile under the influence of applied magnetic fields as would happen in a read operation.

The domains of FIG. 7 include triangular edge domains 3 and central domains 4. These domains are separated by domain walls 5. The arrows 6 represent the magnetic vectors for the respective domains.

The image of FIG. 6 is the result of the use of a permalloy layer of equal thickness with a single layer of 200 angstroms of NiP plated midway through the permalloy thickness in head yoke 2. The FIG. 6 LAMOM image reveals the movement of only one major domain wall in the yoke 2 of the structure with some edge curling areas.

As shown in FIG. 8, edge domains 3 of FIG. 7 are eliminated and are replaced by edge-curling walls depicted by arrows 7. Only one domain wall 8 remains in yoke 2. The edge curling walls 8 result from the rotation (curling) of the magnetic vector both in-plane and from one magnetic layer through the non-magnetic layer to the second magnetic layer.

The domain structure of the laminated permalloy of FIG. 8 is recognized as being less susceptible to Barkhausen noise (J. C. slonczewski, B. Petek and B. E. Argyle, IEEE Transaction on Magnetics, Vol. 24, page 2045, 1988). Thus this method, of laminating permalloy with NiP provides improved domain structure and provides correspondingly better performing heads.

Wet chemical etching poses an additional challenge in the fabrication of permalloy heads laminated with NiP. Where permalloy and NiP contact each other in an etching environment, the NiP assumes a potential which is cathodic to permalloy. This results in a higher etching rate for permalloy and consequently severe undercutting of patterned samples using the traditional permalloy etching process. This problem is avoided by choosing an etching system which minimizing the difference in etch rates between NiP and permalloy. The preferred etchant chosen is relatively mild, consisting of 4% by volume nitric acid and 20 g/l ammonium persulfate in water. This solution is used in a spray etcher at ambient temperature. All etchants studied for these laminated structures act by simultaneously dissolving permalloy and breaking up the NiP film into small flakes and particles. These particles later dissolve fully. The spraying method aids in breaking up and removing these particles from the laminated structure. Etching times were found to increase with the number and thickness of the NiP layers. The problem of undercutting is avoided by this process.

Cr or CrNi laminae

The Cr metal or CrNi alloy laminae of the present invention are also prepared from known techniques such as electrodeposition, sputtering, or vapor deposition on the magnetic laminae.

While the invention has been particularly shown and described with respect to the preferred embodiments thereof, it should be understood by those skilled in the art that the foregoing and other chances in form and detail may be made therein without departing from the spirit and scope of the invention which should be limited only by the scope of the appended claims.

Having thus described our invention, what we claim as new and desire to secure by Letters Patent is:

1. A magnetic recording head comprising a thin film laminate of at least one non-magnetic layer of a magnetic quenching material laminated between two magnetic layers, wherein said non-magnetic layer of magnetic quenching material is NiP and is characterized as having a concentration of at least 10 atomic % phosphorus.

2. A magnetic recording head as in claim 1 in which said magnetic layers are comprised of a magnetic alloy.

3. A magnetic recording head as in claim 2 in which said magnetic alloy is selected from the group consisting of NiFe, CoFe and CoNi.

4. A magnetic recording head as in claim 3 in which said magnetic alloy is NiFe.

5. A magnetic recording head as in claim 1 wherein said laminate comprises a plurality of said laminae of said non-magnetic layer of magnetic quenching material and said magnetic layers.

6. A magnetic recording head as in claim 4 in which each of said NiFe magnetic layers has a thickness of about 100 to 50,000 Å.

7. A magnetic recording head as in claim 5 in which said non-magnetic layer of magnetic quenching material each have a thickness of about 10 to 500 Å.

8. A magnetic recording head as in claim 6 in which said laminate comprises up to about 40 of each of the magnetic and magnetic quenching laminae with the proviso that both of the terminal laminae are magnetic.

9. A magnetic recording head as in claim 1 wherein said non-magnetic layers of magnetic quenching material are non-porous, continuous and stable during annealing.

10. A magnetic recording head comprising a thin film laminate of at least one non-magnetic layer of a magnetic quenching material laminated between two magnetic layers wherein said non-magnetic layer of magnetic quenching material is NiP and is characterized as having a concentration of at least 10 atomic % phosphorus and having a reduced number of domains, a reduced Barkhausen noise and an increased signal to noise ratio as compared to a recording head with a non-laminated thin film.

* * * * *

UNITED STATES PATENT AND TRADEMARK OFFICE
CERTIFICATE OF CORRECTION

PATENT NO. : 5,576,099
DATED : November 19, 1996
INVENTOR(S) : Donald F. Canaperi, et al.

It is certified that error appears in the above-indentified patent and that said Letters Patent is hereby corrected as shown below:

Column 3, line 14: "Nip" should read --NiP--

Column 3, line 25: delete " i "

Column 4, line 43: "g/1 hypophosphite" should read --g/1 sodium hypophosphite--

Column 4, line 58: delete ":"

Column 5, line 2: "+/-5" should read -- +/-5% --

Column 5, line 25: "concentratior" should read --concentration--

Column 6, line 30: "slonczewski" should read --Slonczewski--

Column 6, line 66: "chances" should read --changes--

Column 8, line 4, Claim 7: "layer" should read --layers--

Signed and Sealed this

Fifth Day of August, 1997

Attest:

*Attesting Officer*

BRUCE LEHMAN

*Commissioner of Patents and Trademarks*